J. L. WHEELER.
TIRE PROTECTOR.
APPLICATION FILED AUG. 10, 1917.
1,301,207.
Patented Apr. 22, 1919.
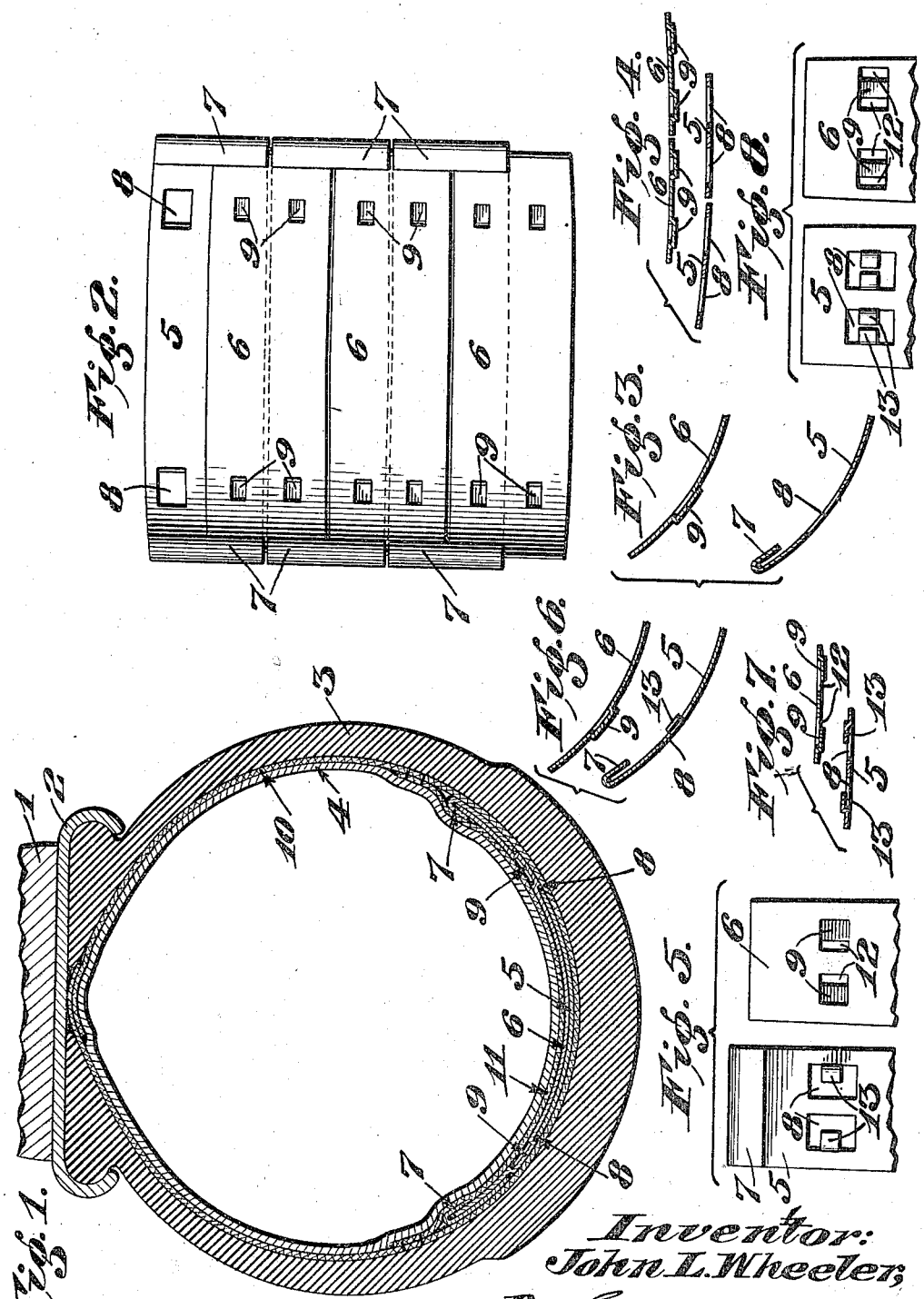
Inventor:
John L. Wheeler,
By George A. Pennington
his Atty

UNITED STATES PATENT OFFICE.

JOHN L. WHEELER, OF ST. LOUIS, MISSOURI.

TIRE-PROTECTOR.

1,301,207.  Specification of Letters Patent.  Patented Apr. 22, 1919.

Application filed August 10, 1917. Serial No. 185,428.

*To all whom it may concern:*

Be it known that I, JOHN L. WHEELER, a citizen of the United States, and resident of St. Louis, in the State of Missouri, have invented certain new and useful Improvements in Tire-Protectors, of which the following is a specification.

This invention relates to pneumatic tires, and more particularly to that class of inflated tires comprising a detachable outer casing and inner air tube. It has for its object to produce a practical and efficient armored lining which may be readily applied to any ordinary outer casing so as to prevent puncturing the air tube without taking from the elasticity and resiliency of the tire.

The invention consists in the parts and in the combinations and arrangements of parts hereinafter described and claimed.

In the accompanying drawing forming part of this specification and wherein like characters refer to like parts wherever they occur throughout the several views,—

Figure 1 is a cross section through a tire equipped with an armored lining according to the invention;

Fig. 2 is a fragmentary inner face view of one form of the armor;

Fig. 3 is a view showing portions of the inner and outer armor plates in longitudinal section;

Fig. 4 is a similar view in transverse section;

Fig. 5 is a view illustrating a modification of the means for securing the plates together;

Figs. 6 and 7 are, respectively, longitudinal and transverse sections of the modified engaging means shown in Fig. 5; and Fig. 8 is a view illustrating a further modification of the engaging means.

Referring now more particularly to Figs. 1 to 4, inclusive, of the drawings, the numeral 1 indicates the felly of a wheel having the usual clencher rim 2 on the periphery thereof for holding the tire. The tire comprises an ordinary outer casing 3 and detachable inner air tube 4.

Between the tread portion of the outer casing and the inner tube is an armor comprising transversely disposed plates or staves, shaped with a bilge like a barrel stave, so that, when placed edge to edge and in a double layer in staggered relation, they conform to, and provide a complete covering for, the inner side of the tread portion of the tire.

These plates or staves are of relatively thin and pliable, but tough, metal, to avoid detracting from the desired resiliency of the tire and yet prevent puncturing the inner tube by a nail or anything sharp that may be driven through the tread of the outer casing. The preferred material is spring steel or else that which is known in the trade as half hard, cold rolled, semi-tempered, steel, of between seven and ten thousandths of an inch in thickness; and, while resilient metal is desirable, it is not absolutely necessary, so long as the metal is sufficiently pliable and tenacious enough to withstand the impact of anything which is liable to puncture the inner tube, as the air pressure in the tube will yieldably hold the plates against, and conform them normally to the contour of, the inner side of the outer casing.

The outer plates 5 are somewhat longer than the inner plates 6 and the end portions of the outer plates 5 are preferably turned over, as at 7, so as to overlie the end portions of the inner plates 6. The outer plates 5 are provided, near their ends and side edges, with openings 8, while the inner plates 6 have indentations or embossments 9 correspondingly located so as to enter said openings 8 when the plates are assembled in a double layer and in staggered relation.

The openings 8 are slightly larger than the embossments 9 and there is a slight clearance between the meeting edge portions of the adjoining plates of each layer and also between the ends of the inner plates 6 and the bends at the ends of the outer plates 5; so that, while the plates are secured against complete separation, they have a slight transverse and endwise movement with respect to each other. This is to allow a compensating movement of the armor and avoid any stiffness which might interfere with the resilient qualities of the tire.

The armor plates are incased in a lining of canvas, leather or other suitable material or fabric. As shown, this lining comprises a piece or strip 10 covering the entire inner face of the outer casing, its meeting side edges being made to abut or overlap between the inner edges of the bead of the casing which is engaged by the rim of the wheel, and this strip is also of a length that its meeting end portions are overlapped when it is applied. On the inner side of the strip 10 is a narrower strip 11 which is stitched or otherwise secured thereto adjacent to the ends of the armor plates, forming an envelop or sleeve in which the plates are incased.

The embossments 9 are projected beyond the faces of the respective plates 6 approximately the thickness of the metal so that when they are in the openings 8 they do not project beyond the outer faces of the plates 5. Hence, there are no protuberances on the outer face of the armor to chafe and cause undue wear on the lining; and to minimize friction between the plates a liberal quantity of powdered graphite or other suitable lubricant is scattered in the envelop incasing the plates.

While the coöperating openings 8 and indentations 9 in conjunction with the overhanging lips 7 serve to maintain the respective plates in their proper relation, the structure may be modified as shown in Figs. 5 to 7, inclusive, of the drawing. In this modification the plates 6 are slotted, as at 12, inward with respect to, and adjoining, the indentations 9, while at the outer sides of the openings 8, tongues 13 are struck up from the plates 5, so that, when the plates are assembled, said tongues extend up through said slots and rest in said indentations, sufficient clearance being provided between the parts so engaged to permit the relative movement of the plates as above set forth.

A further modification is shown in Fig. 8, wherein the slots 12 are provided at opposite sides of the indentations and the tongues 13 are correspondingly provided at opposite sides of the openings 8.

In both modifications the tongues 13 are offset from the inner faces of the plates 5 just about the thickness of the metal so as to be flush with the plates 6 and avoid chafing the enveloping fabric. It is also noted that in the modification shown in Fig. 8 the rebending of the end portions of the outer plates 5 is dispensed with, the tongues 13 being depended upon to hold the plates together. The rounded ends of the plates 5 produced by the formation of the lips 7 are, however, the more desirable, as there is less liability of cutting the envelop and the necessity for providing the tongues 13 is obviated, and the coöperative engagement of the indentations 9 in the openings 8 being sufficient to limit the transverse movement of the plates relative to each other. This structure is more easily manufactured and assembled, it being only necessary to form the respective plates, giving them the normal curvature or set corresponding to the normal contour of the inner side of the tire casing, and then buckling the inner plates 6 and inserting the ends thereof under the lips 7 of the outer plates 5, whereupon said inner plates 6 will, of themselves, spring into place with their indentations 9 entering the openings 8 of the outer plates 5. That is, providing the plates are made of full spring or semi-tempered steel as first above pointed out.

It is not, however, absolutely necessary that the plates be given a normal curvature or set, whether they are made of spring metal or merely pliable metal, as they may be normally flat and the air pressure in the inner tube depended upon to press and conform them to the contour of the tire casing.

By constructing the armor of relatively thin, but tenacious, metal, as herein shown and described, a relatively light, durable and efficient protector is produced, which is readily applied to any ordinary casing without detracting from the resiliency of the tire. The arrangement of the armor plates in a double layer and in staggered relation produces a complete covering of the tread of the tire and greatly reduces the liability of puncturing the inner tube if not absolutely preventing the same.

Obviously, the structure admits of considerable modification without departing from the spirit of the invention as defined by the appended claims, and it is, therefore, not limited to the constructions and arrangements shown in the accompanying drawing.

What is claimed is:

1. An armored lining for pneumatic tire casings, the same comprising a series of unattached, pliable, stave-like plates arranged edge to edge and disposed transversely of the tire, and a superposed layer of plates of like character and arrangement, the respective plates of the one layer overlapping two adjoining plates of the other layer, each plate of the one layer being apertured between the middle and each margin thereof, and each plate of the other layer having protuberances on its contiguous face and coincident with and entering the apertures of the overlapping plates, said protuberances being of smaller dimensions than said apertures, whereby the several plates are capable of limited sliding movement with respect to each other.

2. An armored lining for pneumatic tire casings, the same comprising a series of unattached, pliable, stave-like plates arranged edge to edge and disposed transversely of the tire, and a superposed layer of plates of like character and arrangement, the respective plates of the one layer overlapping two adjoining plates of the other layer, and the end portions of the plates of the one layer being rebent and overlapping the adjacent end portions of the respective plates of the other layer with limited endwise clearance, each plate of the one layer being apertured between the middle and each margin thereof, and each plate of the other layer having protuberances on its contiguous face and coincident with and entering the apertures of the overlapping plates, said proturberances being of smaller dimensions than said apertures, whereby the several plates are capable of limited sliding movement with respect to each other.

3. In a tire armor, a multiplicity of pliable, stave-like plates disposed transversely of the tire and in superposed layers, the plates of each layer being arranged in disjoined edge to edge relation and each plate overlapping two adjoining plates of the superposed layer, the marginal portions of each plate of the one layer being apertured and each plate of the other layer having correspondingly located embossments, of smaller dimensions than, and entering the perforations of the overlapping plates, and the end portions of the plates of the one layer being rebent and overlapping the adjacent end portions of the plates of the other layer with endwise clearance, whereby the several plates are capable of limited sliding movement with respect to each other.

4. A tire protector comprising a multiplicity of pliable metal plates conformable to the inner contour of the tire casing, said plates being assembled the one upon another in a double layer and in staggered relation, the plates of one layer having openings therein and the contiguous faces of the plates of the other layer having protuberances entering said openings, said openings being larger than said protuberances so as to permit limited lengthwise and crosswise sliding movement of the several plates with respect to each other and the elevation of said protuberances being substantially the same as the thickness of the engaging plate.

5. A tire armor comprising two superposed layers of pliable, stave-like plates, the plates of each layer being arranged edge to edge and disconnected, and each plate overlaping two adjoining plates of the superposed layer, each plate of the one layer having slotted embossments raised substantially to the thickness of the plate, and each plate of the superposed layer having correspondingly located apertures, of larger dimensions than, and for the reception of said embossments, said last mentioned plates also having tongues offset substantially to the thickness of the plate and projected upon the respective embossments with edgewise clearance.

Signed at St. Louis, in the State of Missouri, this 4th day of August, A. D. 1917.

JOHN L. WHEELER.

Copies of this patent may be obtained for five cents each, by addressing the "Commissioner of Patents, Washington, D. C."